US011585388B2

(12) United States Patent
Miller et al.

(10) Patent No.: US 11,585,388 B2
(45) Date of Patent: Feb. 21, 2023

(54) NEEDLE RETAINER FOR CONSTANT VELOCITY JOINT AND METHOD OF DETERMINING TRUNNION SHAPE

(71) Applicant: Steering Solutions IP Holding Corporation, Saginaw, MI (US)

(72) Inventors: Jon N. Miller, Merrill, MI (US); Jeff P. Courville, Frankenmuth, MI (US); Eduardo R. Mondragon-Parra, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 392 days.

(21) Appl. No.: 16/752,063

(22) Filed: Jan. 24, 2020

(65) Prior Publication Data
US 2020/0240475 A1     Jul. 30, 2020

Related U.S. Application Data

(60) Provisional application No. 62/798,787, filed on Jan. 30, 2019.

(51) Int. Cl.
*F16D 3/205*      (2006.01)
*F16C 33/60*      (2006.01)
(Continued)

(52) U.S. Cl.
CPC .......... *F16D 3/2055* (2013.01); *F16C 33/605* (2013.01); *F16C 19/466* (2013.01); *F16D 2003/2026* (2013.01); *Y10S 464/905* (2013.01)

(58) Field of Classification Search
CPC ........... F16D 3/2055; F16D 2003/2026; F16D 3/223; F16D 2003/22303; F16C 33/605; F16C 19/466; Y10S 464/905
(Continued)

(56) References Cited

U.S. PATENT DOCUMENTS 4,371,356 A * 2/1983 Dore ...................... F16D 3/2055
                                                                    464/111
4,693,698 A * 9/1987 Olson, II .............. F16D 3/2055
                                                                    464/111
(Continued)

FOREIGN PATENT DOCUMENTS

CN          101641529 A       2/2010
CN          108700127 A       10/2018
(Continued)

OTHER PUBLICATIONS

Universal Joint and Driveshaft Design Manual, AE-7, Society of Automotive Engineers, Inc. Section 3.2.6, pp. 131-140, TJ1079.S62 (Year: 1979).*

(Continued)

*Primary Examiner* — Greg Binda
(74) *Attorney, Agent, or Firm* — Dickinson Wright PLLC

(57) ABSTRACT

A constant velocity joint includes a trunnion extending radially outwardly about a trunnion axis. The joint also includes a ball surrounding the trunnion and rotatable relative thereto about a plurality of needle rollers. The joint further includes a retainer that is a single, unitary structure coupled to the trunnion and positioned to limit movement of the ball and the needle rollers in a direction parallel to the trunnion axis.

8 Claims, 6 Drawing Sheets

(51) Int. Cl.
*F16D 3/202* (2006.01)
*F16C 19/46* (2006.01)

(58) Field of Classification Search
USPC .................................................. 464/111, 132
See application file for complete search history.

(56) References Cited

U.S. PATENT DOCUMENTS

| | | |
|---|---|---|
| 5,571,047 A | 11/1996 | Stall et al. |
| 6,120,382 A | 9/2000 | Sone et al. |
| 7,008,325 B2 * | 3/2006 | Bongartz .............. F16D 3/2055 464/111 |
| 7,635,306 B2 * | 12/2009 | Ando .................... F16D 3/2055 464/111 |
| 2018/0045249 A1 | 2/2018 | Sugiyama et al. |
| 2018/0266491 A1 | 9/2018 | Sugiyama et al. |

FOREIGN PATENT DOCUMENTS

| | | |
|---|---|---|
| DE | 19754433 A1 | 6/1998 |
| EP | 1995481 A1 | 3/2013 |
| JP | 4654130 B2 | 3/2011 |
| WO | 2017051656 A1 | 3/2017 |

OTHER PUBLICATIONS

English Translation of First Office Action and Search Report regarding corresponding CN App. No 202010077632.3; dated Jan. 29, 2022.

* cited by examiner

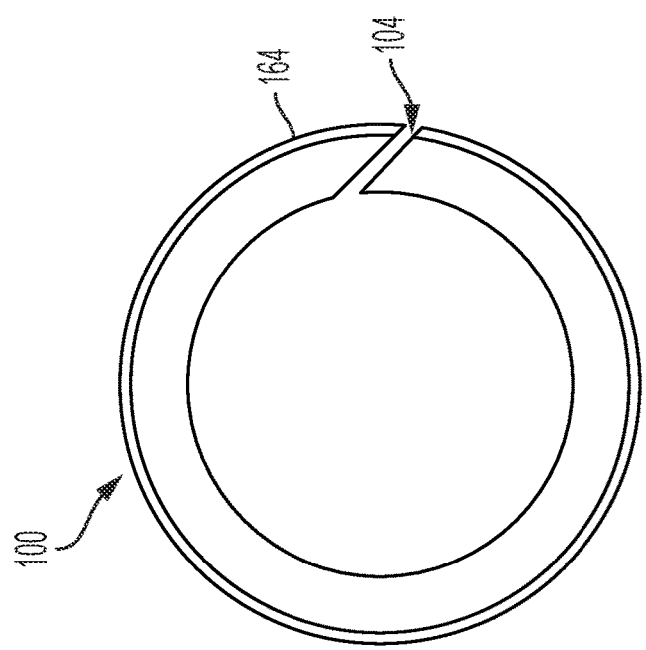
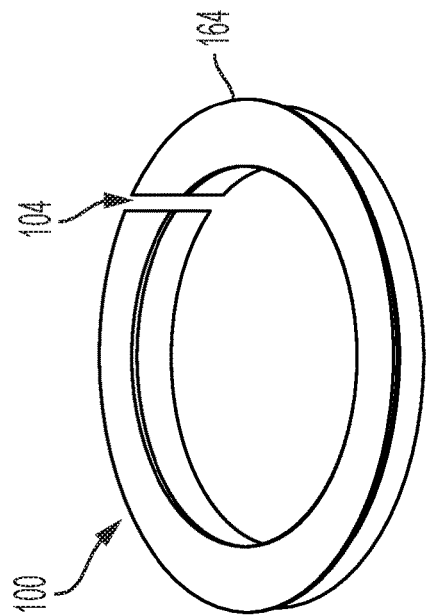
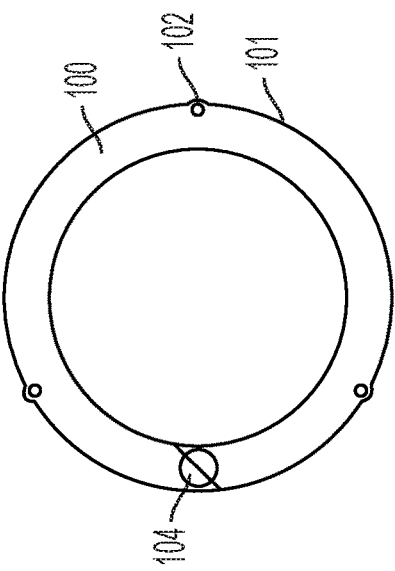

NEEDLE RETAINER FOR CONSTANT VELOCITY JOINT AND METHOD OF DETERMINING TRUNNION SHAPE

CROSS-REFERENCE TO RELATED APPLICATION

This application claims the benefit of U.S. Provisional Patent Application Ser. No. 62/798,787, filed on Jan. 30, 2019, which is incorporated herein by reference in its entirety.

BACKGROUND

Constant velocity joints are widely used for the transmission of rotational energy. Constant velocity joints allow a drive shaft to transmit power through a variable angle, at constant rotational speed. One type of telescoping constant velocity joint is referred to as a tripot joint. Tripot joints are particularly useful for automotive axial drive shafts, particularly in front-wheel-drive vehicles between the transaxle differential and the driving wheel, as well as other applications. These telescoping constant velocity joints transmit a torque at various rotational speeds, joint angles and telescopic positions between shaft members.

Constant velocity joints in their existing condition have the risk of fracturing roller retainers or ring retainers when subjected to high torque durability tests with excessive severity. Such a test generates cyclic loads that cause fatigue of the components.

SUMMARY

According to one aspect of the disclosure, a constant velocity joint includes a trunnion extending radially outwardly about a trunnion axis. The joint also includes a ball surrounding the trunnion and rotatable relative thereto about a plurality of needle rollers. The joint further includes a retainer that is a single, unitary structure coupled to the trunnion and positioned to limit movement of the ball and the needle rollers in a direction parallel to the trunnion axis.

According to another aspect of the disclosure, a tripot joint includes a first trunnion. The joint also includes a second trunnion. The joint further includes a third trunnion, wherein each of the first, second and third trunnions extend radially outwardly about respective trunnion axes. The joint yet further includes a first ball surrounding the first trunnion and rotatable relative thereto about a first plurality of needle rollers. The joint also includes a second ball surrounding the second trunnion and rotatable relative thereto about a second plurality of needle rollers. The joint further includes a third ball surrounding the third trunnion and rotatable relative thereto about a third plurality of needle rollers. The joint yet further includes a first retainer ring that is a single, unitary structure surrounding a portion of the first trunnion and positioned to limit movement of the first ball and the first needle rollers. The joint also includes a second retainer ring that is a single, unitary structure surrounding a portion of the second trunnion and positioned to limit movement of the second ball and the second needle rollers. The joint further includes a third retainer ring that is a single, unitary structure surrounding a portion of the third trunnion and positioned to limit movement of the third ball and the third needle rollers.

According to another aspect of the disclosure, a method of determining a shape of a trunnion in a constant velocity joint includes defining at least three parameters to be used in a parametric equation.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 is a perspective view of a retainer ring of the roller retention assembly of FIG. 2;

FIG. 5 is a plan view of the retainer ring;

FIG. 6 is a plan view of the retainer ring according to another aspect of the disclosure;

DETAILED DESCRIPTION

Figure 1:
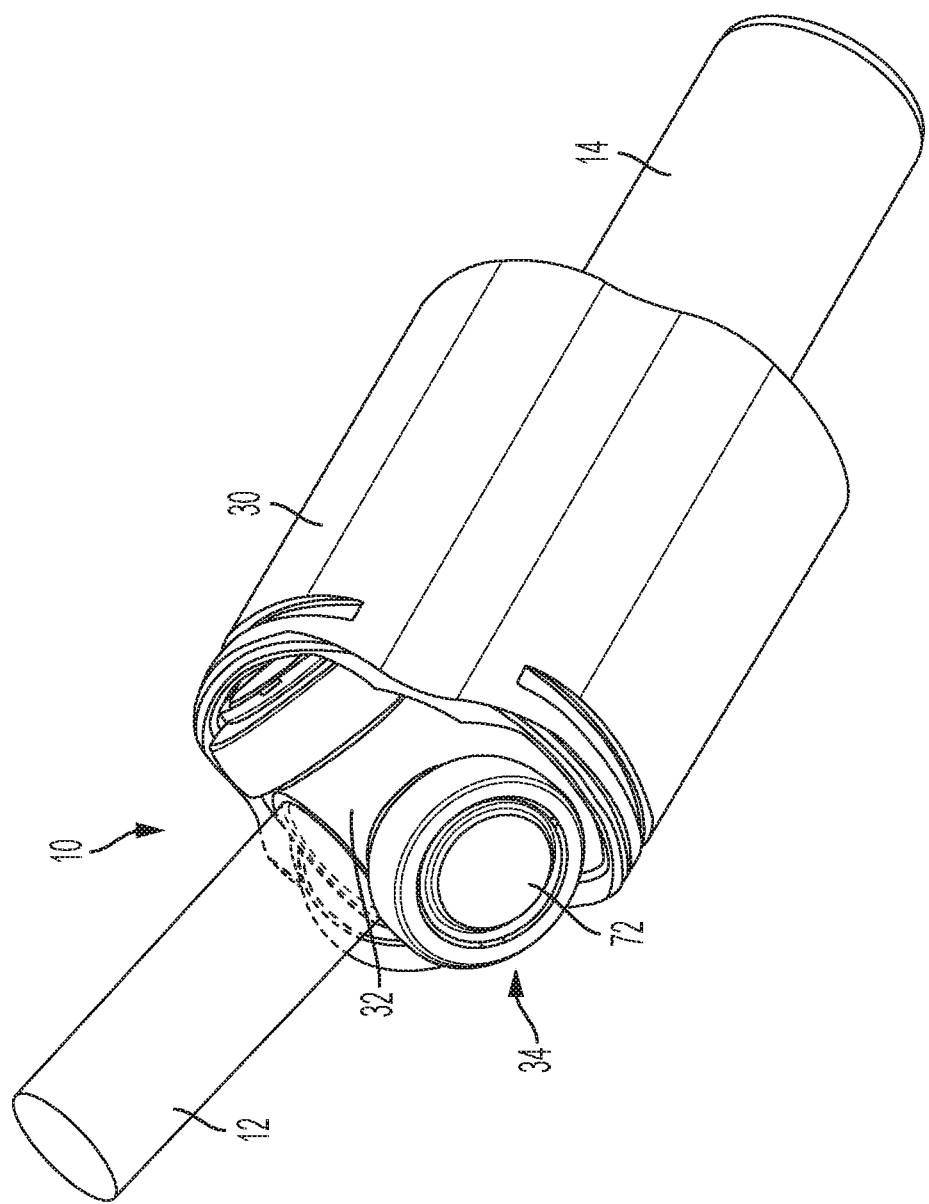
FIG. 1 is a perspective view of a constant velocity joint.

Referring now to the Figures, where the invention will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to the Figures, a constant velocity joint 10 is shown. The constant velocity joint is a telescoping constant velocity joint, which is also referred to herein as a tripot constant velocity joint, or simply a tripot joint. The tripot joint 10 is provided with a vehicle such as a truck, automobile, recreational vehicle, cargo vehicle, or the like. Such a tripot joint 10 may be suitable for use in front wheel drive vehicles and is disposed between and operatively coupled to a transaxle and a driving wheel or other applications where torque is transferred between two rotatable shaft members with possible axial position or angular position changes relative to each other. The tripot joint 10 transmits torque between a first shaft member 12 and a second shaft member 14. The tripot joint 10 is configured to transmit torque from the first shaft member 12 to the second shaft member 14 through various rotational speeds, joint angles, or telescopic positions.

The first shaft member 12 extends along a first axis. The second shaft member 14 extends along a second axis. The first shaft member 12 and the second shaft member 14 are configured to articulate and/or telescope relative to each other about their respective axes. The first axis and the second axis coincide or are collinear when the tripot joint 10 is at a joint angle of 0 degrees. The first axis and the second axis intersect when the tripot joint 10 is articulated or bent at an angle, i.e. When the first shaft member 12 and the second shaft member 14 are articulated relative to each other. The tripot joint 10 includes a housing 30, spider members 32, and a ball set 34.

The housing 30 is connected to the first shaft member 12 and extends along the first axis. The combination of the housing 30 and the first shaft member 12 are rotatable about the first axis. The housing 30 defines a plurality of ball set tracks or guide channels. Each guide channel extends substantially parallel to the first axis. As shown, the housing 30 defines three guide channels that are radially spaced from the first axis. Each guide channel is equally circumferentially spaced apart at 120° intervals from each other.

Figure 3:
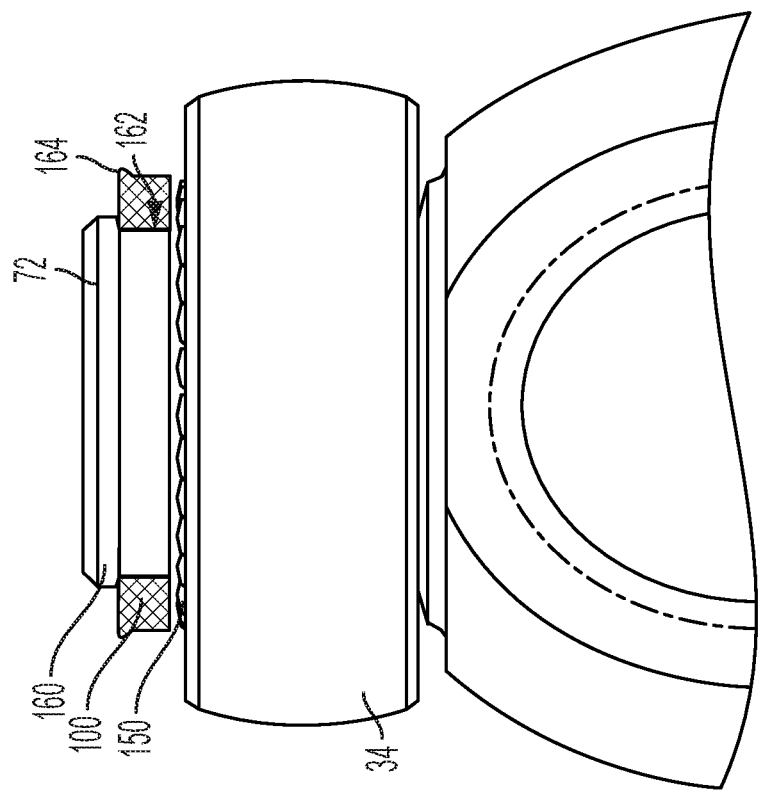
FIG. 3 is an elevational view of the roller retention assembly of FIG. 2.
Figure 2:
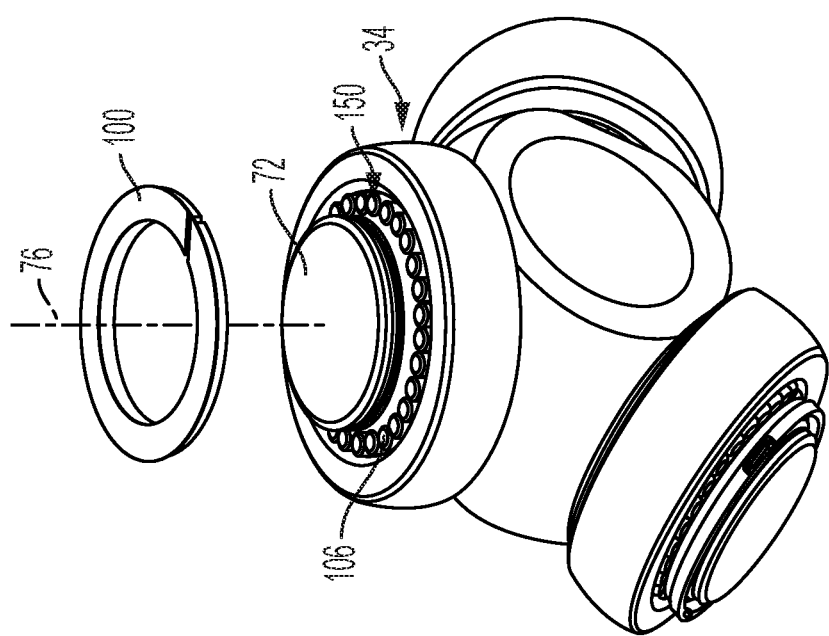
FIG. 2 is a perspective view of a roller retention assembly for the constant velocity joint according to one aspect of the disclosure.

Referring now to FIGS. 1-3, each spider member 32 is configured as a trunnion 72. The trunnion 72 extends along a trunnion axis 76 away from the second axis. The trunnion axis 76 is disposed substantially perpendicular to the second axis. The trunnion 72 has a functional outer surface that transmits torque or force that is adjacent to a non-functional outer surface of the trunnion 72 that does not transmit torque or force. The ball set 34 is disposed on the functional outer surface of the trunnion 72. The trunnion 72 rotatably supports the ball set 34. As shown in the Figures, three ball assemblies are provided and disposed on respective trunnions. The ball set 34 is disposed on the trunnion 72 and is slidably or rollingly received within their respective guide channel.

The embodiments disclosed herein address the condition of fracturing roller retainers or ring retainers by consolidating two components into a single component, which has the ability to support higher cyclic loads.

In one embodiment (FIGS. 2-5), a single retainer ring 100 is provided to both limit axial motion of a plurality of needle rollers 150 and keep the keep the ball set 34 attached to the trunnion 72. FIG. 2 shows the retainer ring 100 disassembled from the trunnion 72 and FIG. 3 illustrates the retainer ring 100 in an assembled condition with the trunnion 72.

As shown in FIGS. 4 and 5, the retainer ring 100 has a cut 104, with respect to the outer diameter tangent, which allows expansion of the retainer ring for installation. This flexibility allows expansion of the retainer ring 100 to pass over a head portion 160 of the trunnion 72 until then retracting to securely fit within a groove 162 of the trunnion 72 that is at least partially defined by the head portion 160. The cut 104 also allows continuous movement of the needle rollers 150. In some embodiments, the cut 104 is about 45 degrees. The cut 104 is combined with flat ends 106 (FIG. 2) of the needle rollers 150. The flat ends 106 allow a continuous motion along the retainer ring 100 without experiencing a "discontinuity" when passing through the cut 104. In particular, the flat ends 106 prevent pulses or impulses due to ring discontinuity.

The retainer ring 100 is assembled to the trunnion 72 in any suitable manner, such as by a press fit operation, for example. The retainer ring 100 eliminates the need for a separate retainer. Upon installation of the retainer ring 100 to the trunnion 72, the axial retention feature 164—which may be a flange, tabs, or a similar protrusion—axially limits motion of a respective ball of the ball set 34.

FIG. 6 illustrates the retainer ring 100 with staked dimples 102. The staked dimples 102 facilitate retention of the ball members. In some embodiments, three staked dimples are provided and each is circumferentially spaced from one other at about 120 degrees around the outer diameter 101 of the retainer ring 100.

Figure 7:
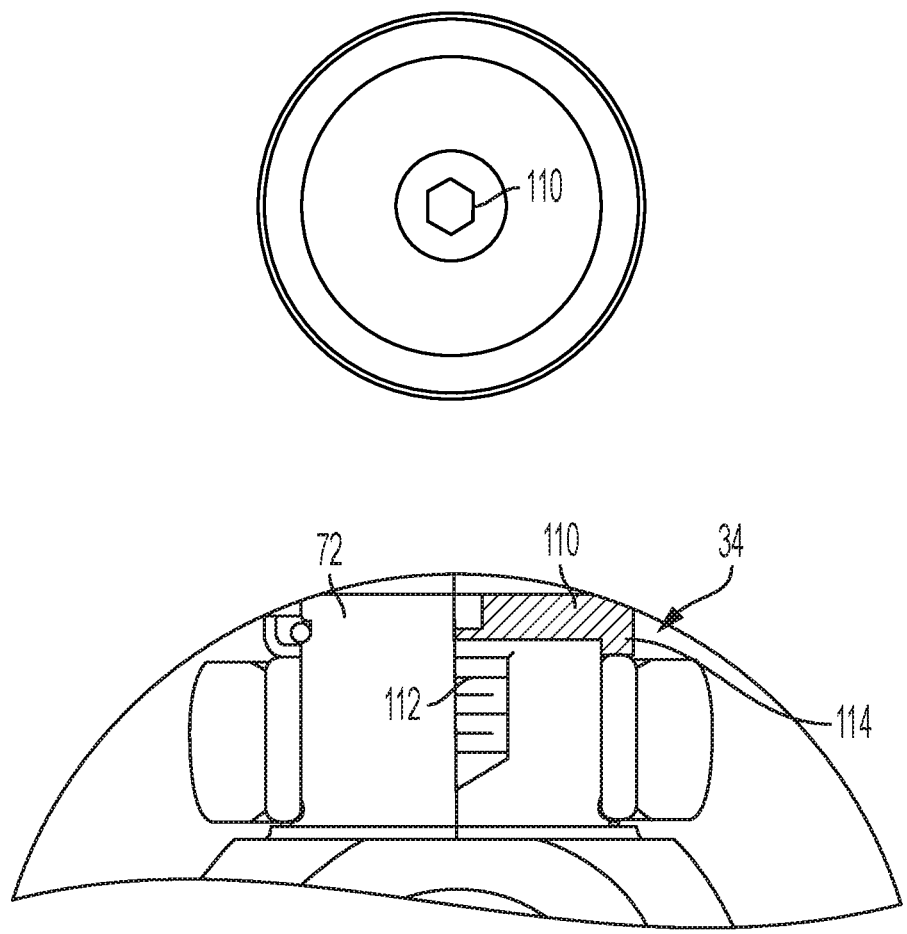
FIG. 7 is a view of the roller retention assembly for the constant velocity joint according to another aspect of the disclosure.

In another embodiment (FIG. 7), a cap 110 is bolted to the center of the trunnion 72. The cap 110 may be formed of alloyed steel in some embodiments. The thread 112 of the cap 110 can be selected or designed to endure cyclic loading. The area of the cap 110 that contacts the needle rollers has a tapered segment 114, similar to the tapered area at the base of the trunnion 72. This facilitates a rolling motion on the needle rollers. The cap 110 may feature staked dimples for ball retention or a lip that functions as a positive stop to retain the ball. The bolted cap 110 replaces a ring and retainer required in prior designs and eliminates the risk for fracture during loading conditions.

The embodiments described herein are simple and may reduce manufacturing costs, as no special operations (e.g., adding internal thread) are necessary on the trunnion in some embodiments.

Figure 8:
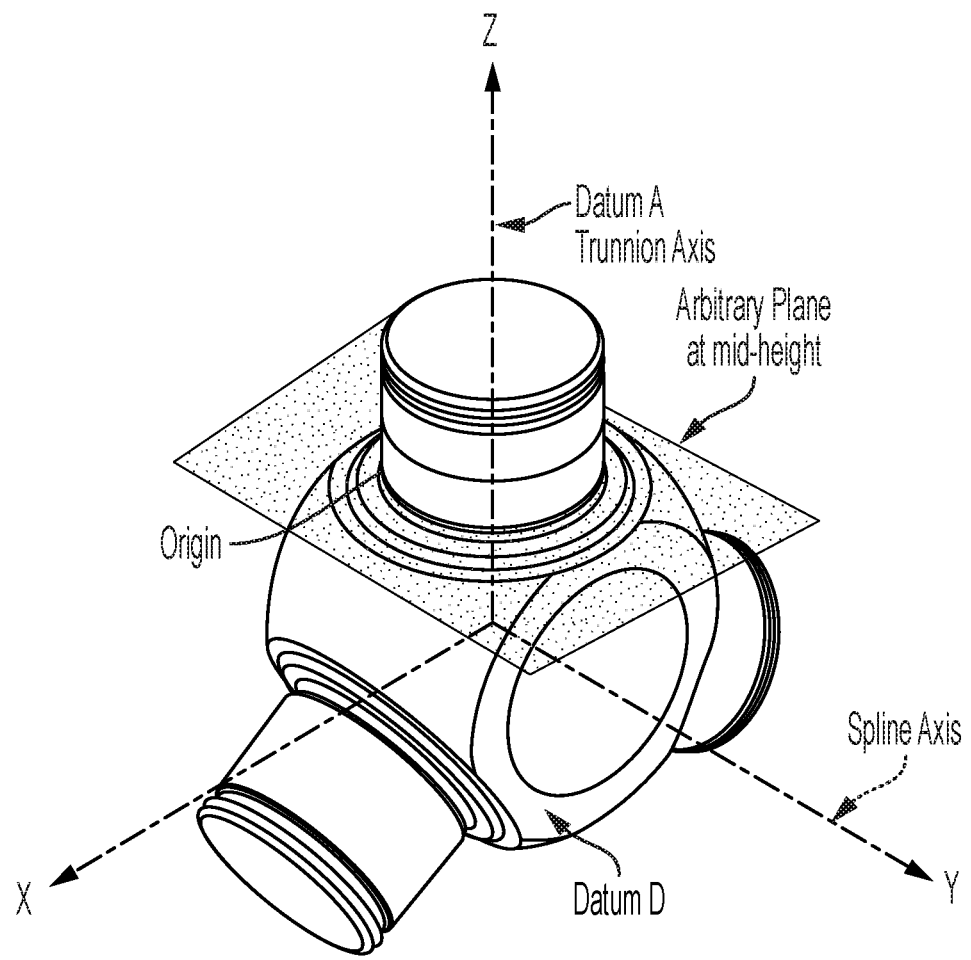
FIG. 8 is a perspective view of the roller retention assembly with Cartesian coordinates for determining a parametric trunnion shape of the assembly.
Figure 9:
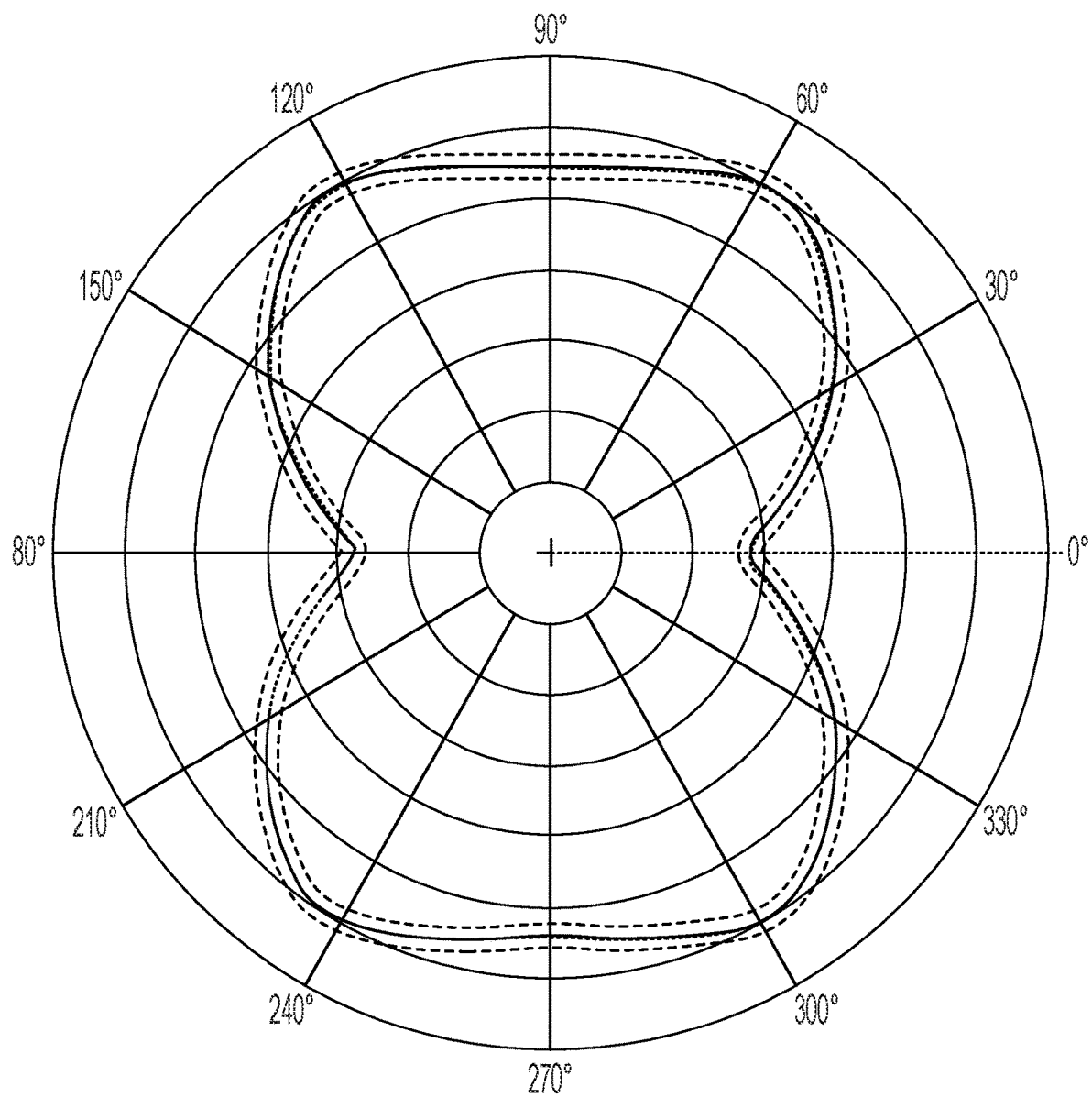
FIG. 9 is a view of polar coordinates for determining a parametric trunnion shape of the assembly.

Referring now to FIGS. 8 and 9, a method of determining a parametric shape of the trunnion 72 is illustrated. While the above-described trunnions of the disclosed embodiments may be circular in cross-section to form substantially cylindrical trunnions, the disclosure also provides for alternative shapes. As discussed above, the needle rollers 150 have a reciprocating motion on the trunnion surface during joint operation. The amplitude of the needle displacement along the periphery of the trunnion is a function of joint angle and the load distribution among needles is a function of the applied torque. This combination of load and reciprocating displacement generates an intermittent stress field on the trunnion, which will eventually cause the contact surfaces to fail due to fatigue. This phenomena is known as spalling. Once spalling has initiated on a surface it will grow quickly changing friction properties and potentially inducing vibration in a driveline transmission system. A spider that is capable of operating for longer periods of time prior to spalling initiation or that is capable of operation at higher loads before spalling initiation would allow either a service life improvement or an overall mas reduction in a system. A way to achieve longer life or operation at higher loads is to distribute more uniformly the load among needles in contact in the trunnion or increase the number of needles carrying load, without increasing the trunnion diameter. Such load distribution can be achieved by altering the nominal shape of the trunnion, from cylindrical or circular, if looking at the transverse cross section of the trunnion, to elliptical, for example.

A design and manufacturing method that allows a seamless transition and flexibility in a mass production environment, from non-circular to circular trunnions and vice versa is disclosed herein and allows for making different trunnion profiles in the same piece of equipment with simple shape parameter changes. Such a design and manufacturing method that alters the trunnion shape based on a set of parametric equations in either Cartesian or polar format is provided herein. Such equations are linked to the Minimum Circumscribed Circle defining the trunnion diameter (FIG. 9).

Parametric equations in Cartesian format can be converted into a polar form and vice versa. The geometric shape defined by such equations is a function of the number of parameters and its relationship. For example, a circular shape requires only one parameter, which is the radius; an elliptical shape requires two parameters, which are the minor and major semi-axes. Complexity can be increased adding parameters. A shape with three or more parameters is defined as "parametric" in this document. Once a basic parametric equation has been established, its parameters can be tuned to change the load distribution characteristics on a trunnion, based on a given set of operating conditions, such as joint angle and transmitted torque. The parametric equation(s) can be programmed into the controller of a CNC grinder. Then changing trunnion shape becomes a matter of changing the parameters of the equation. A representative equation is as follows:

$$r(\theta)=a_1+a_2\cos(2\theta)+a_3\cos(4\theta)+a_4\cos(6\theta)+a_5\cos(8\theta)+a_6\cos(10\theta)+\ldots+a_n\cos(2(n-1)\theta)$$

where,
θ=Angular location (orientation)
r(θ)=Trunnion radial value
$a_i$=Parameter, for i=1, . . . , n A 3-parameter flexible equation allows parameter 3 equal to zero and end up with an elliptical shape, or make parameters 2 and 3 equal to zero and end up with a circular shape.

The parametric equation may also be fitted with a phase shift E which may be represented with the following:

$$r(\theta-\varepsilon)=a_1+a_2\cos(2(\theta-\varepsilon))+a_3\cos(4(\theta-\varepsilon))+a_4\cos(6(\theta-\varepsilon))+a_5\cos(8(\theta-\varepsilon))+a_6\cos(10(\theta-\varepsilon))+\ldots+a_n\cos(2(n-1)(0-\varepsilon))$$

Although the cosine trigonometric function is shown in the equations above, it is to be appreciated that the parametric equation may be written in terms of a sine function or some other trigonometric function.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A constant velocity joint comprising:
a trunnion extending radially outwardly about a trunnion axis;
a ball surrounding the trunnion and rotatable relative thereto about a plurality of needle rollers; and
a retainer that is a single, unitary structure coupled to the trunnion and positioned to limit movement of the ball and the needle rollers in a direction parallel to the trunnion axis, wherein the retainer is a retainer ring surrounding a portion of the trunnion, wherein the retainer ring includes a cut portion angled relative to a tangent of the outer diameter of the roller retainer ring, wherein the cut portion is angled about 45 degrees relative to the tangent of the outer diameter of the roller retainer ring.

2. The constant velocity joint of claim 1, wherein the trunnion is one of three trunnions extending from a spider to form a tripot joint.

3. The constant velocity joint of claim 1, wherein the retainer ring is disposed within a groove of the trunnion in an assembled condition.

4. The constant velocity joint of claim 1, wherein the retainer ring comprises an axial retention feature that limits motion of the ball in the direction parallel to the trunnion axis.

5. The constant velocity joint of claim 4, wherein the axial retention feature is at least one of a flange, lip and tab.

6. The constant velocity joint of claim 1, wherein the retainer ring comprises a plurality of staked dimples extending from an outer diameter of the retainer ring.

7. The constant velocity joint of claim 6, wherein the roller retainer ring has three staked dimples.

8. The constant velocity joint of claim 1, wherein the trunnion has a parametric cross-sectional shape defined by at least three parameters.

* * * * *